United States Patent [19]

Hogg et al.

[11] Patent Number: 4,838,334
[45] Date of Patent: Jun. 13, 1989

[54] SUNSHIELD WITH OPENINGS

[76] Inventors: Judy S. Hogg, 7300 S. 175 E., Midvale, Utah 84047; Michael Abbondandolo, 1800 Bestland Ave., Deltona, Fla. 32738; Patricia J. Brink, 3720 Sweeten La., Barstow, Calif. 92311

[21] Appl. No.: 118,203

[22] Filed: Nov. 6, 1987

[51] Int. Cl.⁴ .............................................. E06B 9/24
[52] U.S. Cl. ............................ 160/370.2; 160/84.1; 296/97.8
[58] Field of Search ............... 296/97 R, 97 C, 97 D, 296/97 E, 97 F; 160/354, DIG 7, 84 R, 370.2

[56] References Cited

U.S. PATENT DOCUMENTS

| D. 291,682 | 9/1987 | Stone | D12/191 |
|---|---|---|---|
| 1,409,451 | 3/1922 | Jaeger | 296/139 |
| 1,808,652 | 6/1931 | Gump | 296/97 G |
| 2,118,198 | 5/1938 | Hatchaway | 296/97 G |
| 2,419,917 | 4/1947 | Robeson | 2/433 |
| 2,823,744 | 2/1958 | Garris | 160/135 |
| 3,412,506 | 11/1968 | Shiota | 296/97 R |
| 3,868,293 | 2/1975 | Selph | 296/97 F |
| 4,202,396 | 5/1980 | Levy | 296/97 R |
| 4,560,245 | 12/1985 | Sarver | 296/97 D |

Primary Examiner—Robert R. Song
Attorney, Agent, or Firm—Christie, Parker & Hale

[57] ABSTRACT

A folding sunshield for use in motor vehicle windows is improved by the addition of holes for outward vision. The holes can be covered with a tinted material or fitted with movable flaps. The sunshield is also improved by constructing it of soft fabric which can be easily installed in the window or folded and stored.

4 Claims, 3 Drawing Sheets

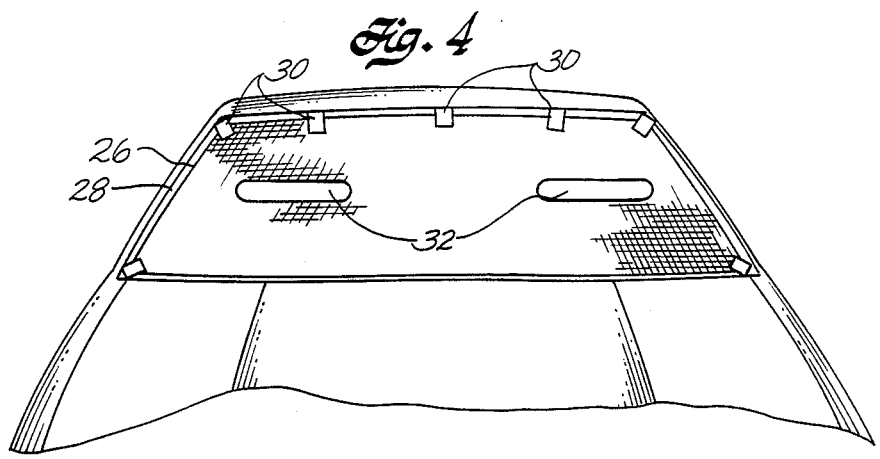
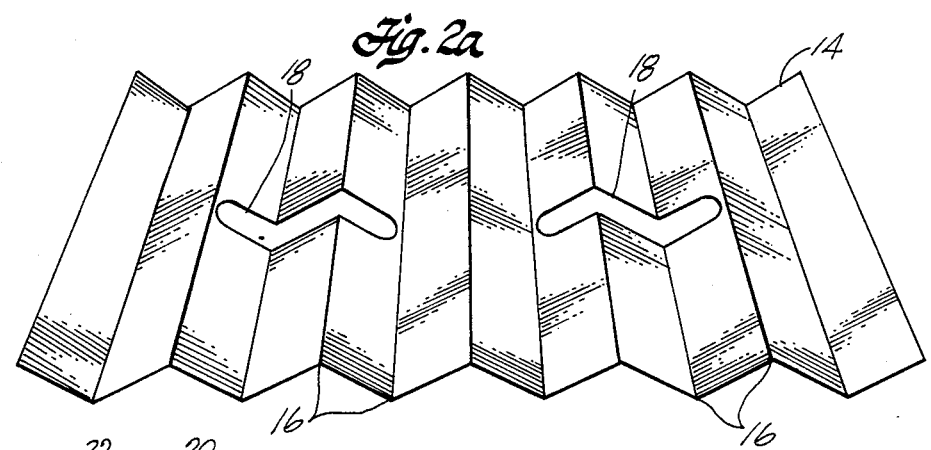
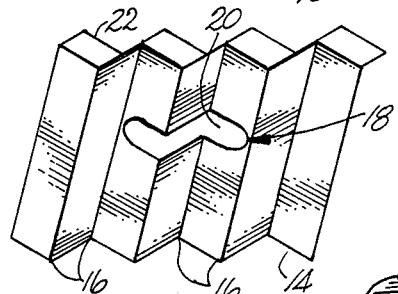
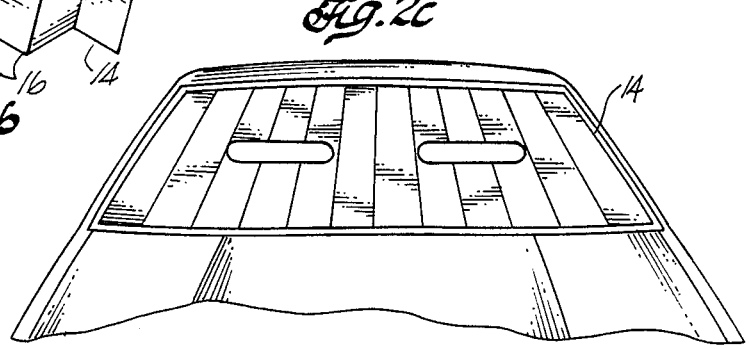

SUNSHIELD WITH OPENINGS

FIELD OF THE INVENTION

This invention relates to sunshields for motor vehicle windows designed to protect the vehicle interior from heat, light and observation and also to sunshields fitted with openings which allow those inside the vehicle to see out.

BACKGROUND OF THE INVENTION

Motor vehicle window sunshields are commonly known. The common variety, described in U.S. Pat. No. 4,202,396 by Levy, is made of a foldable sheet of cardboard. When folded it is a flat small package which is lightweight and easily stored (FIG. 1a). When unfolded, it can be placed across the inside of the front windshield of a motor vehicle 10 so that it blocks most of the light coming through the windshield (FIG. 1b). This variety reduces heat buildup inside the motor vehicle in bright sunlight and protects the interior from damaging solar radiation. This variety of sunshield is inexpensive and can be easily folded into a compact package and stored out of the way when not in use (FIG. 1a).

The present invention addresses two shortcomings of this common variety of sunshield. While the standard cardboard sunshield has many advantages, it blocks substantially all vision out of the shielded window. There are occasions in which a vehicle passenger may wish to see out. For example, a truck driver waiting in a long slow line at a loading dock on a hot day may wish to keep his cabin cool, using the sunshield, but still be able to check the progress of the line. Or someone keeping surveillance from a vehicle on a hot day, may wish to keep the vehicle interior cool and private yet still be able to maintain surveillance. The present invention allows outward vision without substantially reducing the effectiveness of the shield.

The second shortcoming of the standard cardboard sunshield, addressed by the present invention, is that it is bulky. The folded cardboard shield must be at least as long as the shielded window is high. In addition, the cardboard shield is not precisely fitted to the window. It normally rests on the dashboard or some other part of the vehicle interior. The present invention, in one embodiment, can be fitted precisely to the window and folded into a very small package.

SUMMARY OF THE INVENTION

The present invention overcomes two major shortcomings of the standard folding cardboard sunshield mentioned above. It also improves the efficiency and aesthetic appeal of sunshields generally.

The first innovation in sunshield design is to cut holes in the sunshield in the line of sight of the vehicle passengers. This allows the passengers in the vehicle, such as a truck or an automobile, to see out even when the sunshield is in place. Thus, the passengers are afforded privacy and a cool vehicle interior along with the convenience of being able to see out of the vehicle. The holes can be in the shape of slits or any other aesthetic or practical design. The holes can be left open, covered with some tinted material, or fitted with movable covers.

The second innovation in sunshield design is to construct the sunshield of fabric, which is then fastened to the vehicle interior over the window. The fabric shield is easy to set up and store and can also be provided with holes. If provided with holes, these holes can be covered with some tinted material or fitted with movable covers.

Accordingly, the invention is for an opaque sunshield of rigid material or soft fabric. The sunshield can be mounted over the inside of a motor vehicle window. The shield can be either placed in front of the window, relying on its own rigidity, or fastened to the vehicle interior with loop and pile fasteners (commonly available under the trademark "VELCRO"), snaps, or some other fastener, for example.

The sunshield includes one or more openings which allow those inside to see out while the shield is in place. The openings can be covered with a tinted material or fitted with movable flaps, or both.

BRIEF DESCRIPTION OF THE DRAWINGS

FIG. 2a shows a perspective view of a preferred embodiment of the present invention as applied to a vehicle front windshield.

FIG. 2b shows a perspective view of a preferred embodiment of the present invention as applied to a vehicle side window.

FIG. 2c shows the preferred embodiment of FIG. 2a as installed in a vehicle front windshield.

FIG. 4 shows a perspective view of an alternate preferred embodiment of the present invention as applied to a vehicle front windshield mounted in the windshield with loop and pile fasteners.

DETAILED DESCRIPTION OF THE INVENTION

Figure 1B:
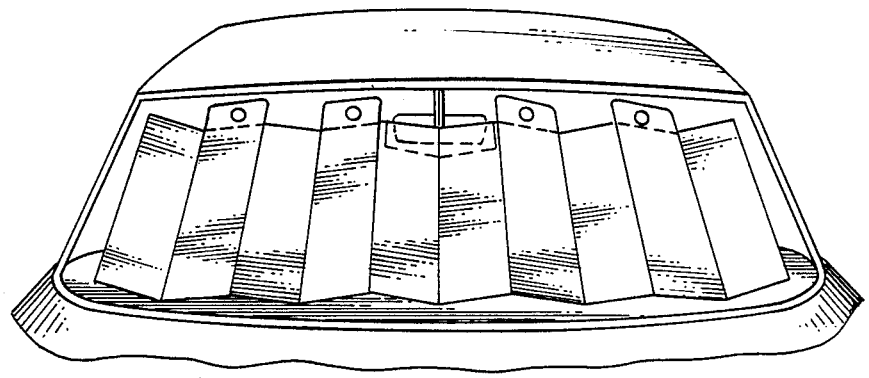
FIG. 1b shows a perspective view of the prior art sunshield of FIG. 1a unfolded and mounted in a vehicle windshield.
Figure 1A:
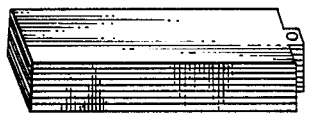
FIG. 1a shows a perspective view of a prior art sunshield in the folded position.

A preferred embodiment of the present invention is illustrated in FIG. 2a. Like the sunshield known in the prior art, FIGS. 1a and 1b, it consists of a sheet of cardboard 14 in the shape of the window to be shielded, although any other rigid material could be used. The cardboard sheet is pressed or perforated in vertical lines 16 so that it may easily be folded into a flat compact package. When unfolded, the shield fits behind the appropriate window inside the vehicle, and shields the vehicle's interior from sunlight, heat and observation.

The cardboard sheet is also cut to form two holes 18 shaped like slits. The slits are cut directly in front of where the passenger and driver would be seated (FIG. 2a). These slits allow the driver and passenger limited outward vision for the driver and passenger without severely reducing the effectiveness of the sunshield.

FIG. 2b shows an application of the sunshield to a side window. Only one slit 20 is necessary because the driver and passenger have the same line of sight. This embodiment can also be fitted with a flap 22 which can be hung over the top of the side window to hold it in place, although other mounting techniques are possible.

The effectiveness of the shield is enhanced further if the slits are covered with, for example, a sheet of dark tinted but translucent plastic. The dark tinted plastic sheet allows good outward visibility on a sunny day but filters out most of the light coming in through the slit. Tinted translucent plastic sheets are inexpensive and therefore add very little to the cost of the shield.

Figure 3:
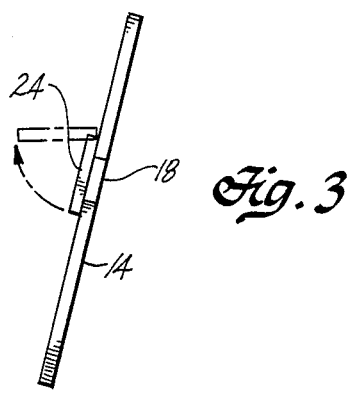
FIG. 3 shows a side view of the preferred embodiment of FIG. 2a in which the hole is covered by a movable flap.

An alternative embodiment would be to provide a cover 24 for the slits 18 made of an opaque material, for example, cardboard or felt, which could be lifted from the inside (FIG. 3). The cover would retain the shielding qualities of a substantially solid shield when the cover was down but would allow those inside the vehicle to look out when desired. Covers can also be easily mounted on the shield without adding substantially to the shield's cost.

In another alternate embodiment, the shield is made of a soft material, for example, felt, which is cut to the shape of the window to be covered. However, while a cardboard shield could rest on the vehicle dashboard, or some other surface, and then rely on its own rigidity for support, the felt shield must be fastened at its top and it may also need to be fastened on the bottom or sides.

FIG. 4 shows the felt shield 26 mounted to a windshield 28. It is fastened to the vehicle interior with "VELCRO" fasteners 30. One side of the "VELCRO" fastener is sewn into the felt material. The other side is attached to the vehicle interior with glue, screws or some other durable fastener. The shield can therefore be easily removed from the "VELCRO" fasteners. It can then be folded into most any convenient shape for storage.

The shield depicted in FIG. 4 can also include slit shaped openings 32 in the felt much like the ones used in the embodiment described above. As with that embodiment of the invention, the slits are designed to allow the driver and passenger to see out. Also, as described with the prior preferred embodiment above, the openings can be covered with a dark tinted translucent material or with felt flaps which be raised or lowered for vision or privacy, respectively.

Figure 5A:
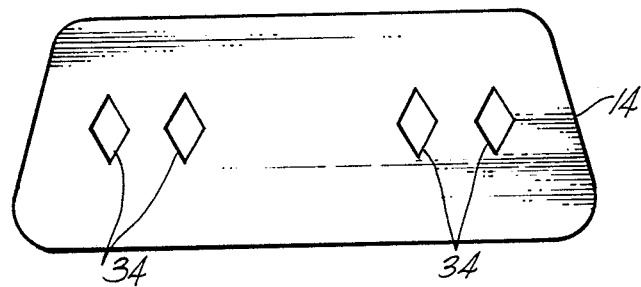
FIG. 5a shows a front view of a variation of the present invention using diamond shaped holes.
Figure 5B:
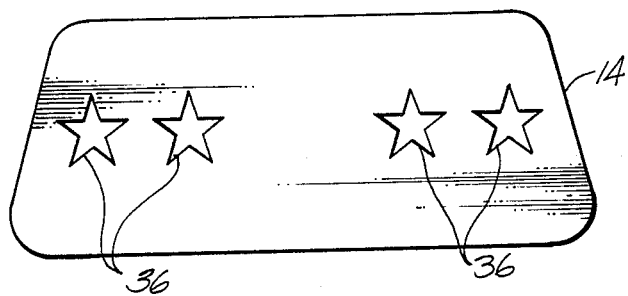
FIG. 5b shows a front view of a variation of the present invention using star shaped holes.
Figure 5C:
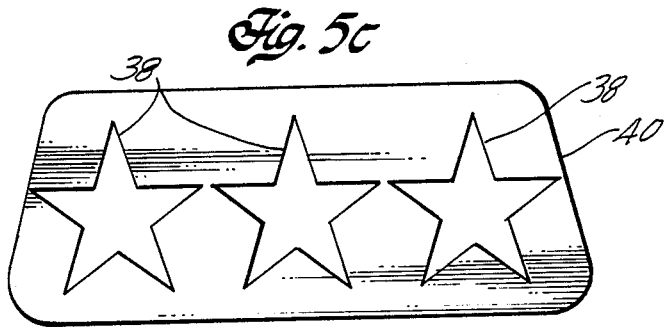
FIG. 5c shows a front view of a variation of the present invention using a star shaped shield.

Many variations are possible in the shape and placement of the openings in the shield. Variations can be used to achieve different aesthetic designs and to increase or decrease the amount of vision possible through the holes FIG. 5a shows a shield using diamond shaped holes 36 instead of slits. FIG. 5b shows a shield using star shaped holes 36 instead of slits. FIG. 5c shows a shield in which the stars 38 are made of opaque material and the remainder of the shield 40 is darkly tinted translucent material.

This description describes several specific embodiments of the present invention. It will be obvious to one skilled in the art that many other embodiments and variations are possible without departing from the spirit and scope of the invention. By describing the embodiments above, the inventor intends in no way to abandon these other embodiments or variations.

What is claimed:

1. A sunshield for use with a motor vehicle window comprising:
    an opaque shield which can be removably mounted between a motor vehicle window and the passenger compartment;
    at least one opening cut into the shield allowing outward vision from the passenger compartment; and
    a moveable cover for the opening, the cover substantially blocking all light entering the motor vehicle through the opening when the opening is covered but allowing outward vision from the passenger compartment when the opening is uncovered.

2. A sunshield for use with a motor vehicle window comprising:
    means for blocking substantially all light entering a motor vehicle through a motor vehicle window;
    means for allowing outward vision from inside the motor vehicle through the light blocking means; and
    means for filtering out light entering the vehicle through the outward vision means.

3. A sunshield for use with a motor vehicle window comprising:
    a rigid foldable sheet which when unfolded conforms substantially to the shape of the motor vehicle window and which can be placed behind the motor vehicle window inside the motor vehicle so as to block light entering the motor vehicle through the window, the sheet having at least one hole to allow outward vision from inside the motor vehicle; and
    a moveable flap covering the hole so that the opening created by the hole may be covered and uncovered from inside the motor vehicle.

4. A sunshield for use with a motor vehicle window comprising;
    a fabric sheet which substantially conforms to the shape of the motor vehicle window, the sheet having at least one hole allowing outward vision from inside the motor vehicle, the hole being covered with a translucent material so as to filter the light entering the motor vehicle interior through the hole;
    a moveable flap covering the hole so that the opening created by the hole may be covered and uncovered from inside the motor vehicle; and
    fasteners fitted to the sunshield and to the interior of the motor vehicle which allow the sunshield to be removably fastened to the motor vehicle so as to substantially block all light entering the motor vehicle interior through the window.

* * * * *